(12) United States Patent
Lim et al.

(10) Patent No.: US 9,242,595 B2
(45) Date of Patent: Jan. 26, 2016

(54) APPARATUS AND METHOD FOR CONTROLLING TAILLIGHT OF VEHICLE, CAPABLE OF BRIGHTNESS CONTROL AND VISIBLE LIGHT WIRELESS COMMUNICATION

(71) Applicant: Electronics and Telecommunications Research Institute, Daejeon (KR)

(72) Inventors: Sangkyu Lim, Daejeon (KR); Myungsoon Kim, Daejeon (KR); Ilsoon Jang, Daejeon (KR); Jindoo Jeong, Daejeon (KR); Taegyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/306,786

(22) Filed: Jun. 17, 2014

(65) Prior Publication Data
US 2015/0008823 A1 Jan. 8, 2015

(30) Foreign Application Priority Data
Jul. 8, 2013 (KR) .................. 10-2013-0079826

(51) Int. Cl.
*B60Q 1/14* (2006.01)
*B60Q 1/30* (2006.01)
*H05B 33/08* (2006.01)

(52) U.S. Cl.
CPC .............. *B60Q 1/30* (2013.01); *H05B 33/0854* (2013.01)

(58) Field of Classification Search
USPC .............. 315/77, 80; 340/469, 479; 307/10.1, 307/10.8; 362/459, 487, 499
See application file for complete search history.

(56) References Cited

U.S. PATENT DOCUMENTS

| 5,909,174 A * | 6/1999 | Dietz et al. .................... 340/479 |
| 5,952,917 A * | 9/1999 | Zimmermann et al. ...... 340/469 |
| 6,016,035 A * | 1/2000 | Eberspacher et al. .......... 315/82 |
| 2001/0054955 A1* | 12/2001 | Diez ............................ 340/435 |

FOREIGN PATENT DOCUMENTS

KR 10-2009-0001105 1/2009

* cited by examiner

*Primary Examiner* — Thuy Vinh Tran
(74) *Attorney, Agent, or Firm* — Nelson Mullins Riley & Scarborough LLP; Anthony A. Laurentano; Michael Malone

(57) ABSTRACT

An apparatus and method for controlling the taillight of a vehicle are disclosed. The apparatus includes a visible light wireless communication data generation unit, a brightness control unit, a variable pulse position modulation (VPPM) signal generation unit, and a light source. The visible light wireless communication data generation unit generates information about the operation of a vehicle. The brightness control unit generates a brightness control value that is used to control the brightness of a light source installed at the tail of the vehicle. The variable pulse position modulation (VPPM) signal generation unit controls a pulse position and a pulse width within a unit pulse section of a pulse that controls the light source based on the information about the operation of the vehicle and the brightness control value.

16 Claims, 7 Drawing Sheets

APPARATUS AND METHOD FOR CONTROLLING TAILLIGHT OF VEHICLE, CAPABLE OF BRIGHTNESS CONTROL AND VISIBLE LIGHT WIRELESS COMMUNICATION

CROSS REFERENCE TO RELATED APPLICATION

This application claims priority to and the benefit of Korean Patent Application No. 10-2013-0079826, filed on Jul. 8, 2013, the entire contents of which is hereby incorporated by reference in its entirety.

BACKGROUND OF THE INVENTION

1. Technical Field

The present invention relates generally to technology for configuring and controlling the taillight of a vehicle and, more particularly, to a method of controlling a taillight which is capable of integrating the function of a sidelight indicative of the presence and width of a vehicle ahead of the driver, especially, during nighttime driving, and the function of a brake light operative to be automatically turned on when a driver steps on the brake of the vehicle and then providing the integrated function, and which is also capable of providing information about the operation of a vehicle to a following vehicle via visible light wireless communication.

2. Description of the Related Art

Recently, lights and display devices using light-emitting diodes (LEDs) have rapidly spread into products for daily life, such as vehicles, traffic lights, billboards, TVs, monitors, mobile devices, special lighting and common lighting. The reason for this is that LED light sources have a longer lifespan, exhibit excellent power efficiency, facilitate digital control, and implement various colors, compared to existing light sources, such as fluorescent lamps or incandescent lamps. Furthermore, active research has been carried out into visible light wireless communication technology that adds communication functionality to LED lights and display devices, thereby achieving both the unique purpose of an LED light source and the purpose of a communication means.

Visible light wireless communication technology is communication technology that wirelessly transfers information using visible light in the wavelength range from 380 nm to 780 nm which is visible to the human eye. This technology is distinguished from existing wired optical communication technology and wireless infrared light communication technology using the infrared wavelength band in that this technology uses light in the visible ray wavelength band.

Unlike radio frequency (RF) wireless communication now being widely used, visible light wireless communication technology can be freely used without any regulations or permission in terms of a frequency use. Furthermore, visible light wireless communication technology is different from RF wireless communication in that it has excellent physical security and a communication link can be checked by a user's eye. Furthermore, visible light wireless communication technology has a convergence technology characteristic that enables both the unique purpose of a light source and communication functionality to be achieved.

Such visible light wireless communication technology includes variable pulse position modulation (VPPM) technology that is capable of performing both a modulation function for sending visible light wireless communication data and a function for controlling the brightness of a lighting source using LED lighting. In this technology, the bit "1" or "0" is represented depending on whether a pulse section in which a light source is turned on is located in the front or rear part of a unit symbol section, and the brightness of the light source can be changed by changing the temporal length of a pulse section in which the light source is turned on.

The brightness of LED lighting may be basically controlled using two methods. One of the two methods is a method of changing the amount of voltage or current applied to an LED light source via an analog circuit, and the other of the two methods is a pulse width modulation (PWM) method of controlling the time during which an LED light source remains turned along a time axis through digital control. In the above-described VPPM modulation technology, the brightness of a light source is controlled using the PWM method.

Each of the existing taillights of a vehicle usually includes two lamps. A sidelight and a brake light are mounted in a single frame and thus form the taillight. In general, the turning on and off of the sidelight is manually controlled by a driver, and the brake light is controlled so that it is turned on when a driver steps on a deceleration pedal in order to reduce the speed of a vehicle. Furthermore, the conventional sidelight and brake light of a vehicle are detected by only the visual perception of a driver who drives a following vehicle, but do not have the function for transmitting data from the sidelight or brake light of the preceding vehicle to a following vehicle via visible light wireless communication.

The conventional taillight of a vehicle is manually turned on or off by a driver. Accordingly, a problem arises in that a following vehicle may become endangered if the taillight of a preceding vehicle is not turned on in nighttime driving, or in that the battery of a vehicle may continue to be consumed because a driver does not turn off a taillight upon parking. Furthermore, it is difficult to provide light of a brightness optimized in proportion to external illumination because the brightness of the taillight is always maintained at a uniform level.

With the rapid replacement of conventional lamps with LED lamps in taillights mounted on various types of vehicles, there is an increasing need for convergence technology including wireless communication functionality using LED lamps and brightness control technology reflecting the characteristics of LED lamps.

As related art, Korean Patent Application Publication No. 10-2009-0001105 discloses an LED lamp for the combined brake and tail light of an automobile.

SUMMARY OF THE INVENTION

At least one embodiment of the present invention is intended to provide a method of controlling the taillight of a vehicle, which is capable of controlling its brightness in response to information about the manipulation of a driver and external input information and also transmitting information about the operation of a vehicle to a following vehicle.

At least one embodiment of the present invention is intended to integrate the function of a sidelight indicative of the presence and width of a vehicle during nighttime driving and the function of a brake light operative to be automatically turned on when a driver steps on the brake of a vehicle into a single function and to then provide the integrated function.

In accordance with an aspect of the present invention, there is provided a method of controlling a taillight of a vehicle, including generating information about an operation of a vehicle; generating a brightness control value that is used to control brightness of a light source installed at a tail of the vehicle; and controlling a pulse position and a pulse width within a unit pulse section of a pulse that controls the light source based on the information about the operation of the vehicle and the brightness control value.

Controlling the pulse position and the pulse width may include controlling a pulse position based on the information about the operation of the vehicle and controlling the pulse width based on the brightness control value.

The brightness control value may provide three brightness levels so that the light source performs the functions of a sidelight and brake light of the vehicle in an integrated manner.

The three brightness levels may include a first brightness level corresponding to a case where a deceleration pedal of the vehicle is fully activated, a second brightness level corresponding to a case where the light source is fully turned off, and a third brightness level corresponding to a predetermined brightness level between the first and second brightness levels.

The first brightness level may be higher than the second brightness level and the third brightness level, the third brightness level may be higher than the second brightness level, and the third brightness level may correspond to any one of sidelight turn-on input and illumination sensor input.

The brightness control value may be set to the first brightness level if the distance between the preceding vehicle and a following vehicle is shorter than a threshold.

The brightness control value may be generated based on any one of sidelight switch operation information, deceleration pedal operation information, user configuration information, illumination sensor input information, and distance input information.

The information about the operation of the vehicle may correspond to any one of bits "1" and "0" depending on the pulse position.

The information about the operation of the vehicle may be generated based on any one of vehicle speed information, vehicle steering information, and vehicle deceleration pedal input information.

In accordance with another aspect of the present invention, there is provided an apparatus for controlling a taillight of a vehicle, including a visible light wireless communication data generation unit configured to generate information about the operation of a vehicle; a brightness control unit configured to generate a brightness control value that is used to control the brightness of a light source installed at the tail of the vehicle; a variable pulse position modulation (VPPM) signal generation unit configured to control a pulse position and a pulse width within a unit pulse section of a pulse that controls the light source based on the information about the operation of the vehicle and the brightness control value; and a light source configured to convert a data signal into an optical signal and to provide the data signal to a following vehicle.

The data signal may control the pulse position based on the information about the operation of the vehicle, and controls the pulse width based on the brightness control value.

The brightness control value may provide three brightness levels so that the light source performs the functions of the sidelight and brake light of the vehicle in an integrated manner.

The three brightness levels may include a first brightness level corresponding to a case where a deceleration pedal of the vehicle is fully activated, a second brightness level corresponding to a case where the light source is fully turned off, and a third brightness level corresponding to a predetermined brightness level between the first and second brightness levels.

The first brightness level may be higher than the second brightness level and the third brightness level, the third brightness level may be higher than the second brightness level, and the third brightness level may correspond to any one of sidelight turn-on input and illumination sensor input.

The brightness control value may be set to the first brightness level if the distance between the preceding vehicle and a following vehicle is shorter than a threshold.

The brightness control value may be generated based on any one of sidelight switch operation information, deceleration pedal operation information, user configuration information, illumination sensor input information, and distance input information.

The information about the operation of the vehicle may correspond to any one of bits "1" and "0" depending on the pulse position.

The information about the operation of the vehicle may be generated based on any one of vehicle speed information, vehicle steering information, and vehicle deceleration pedal input information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
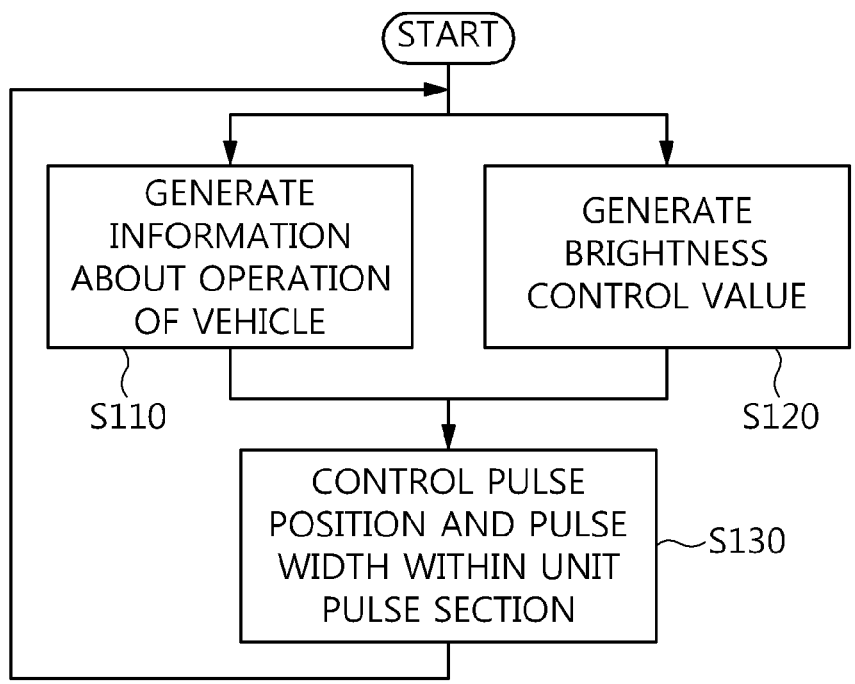
FIG. 1 is a flowchart illustrating a method of controlling a taillight which is capable of brightness control and wireless communication according to an embodiment of the present invention.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

Embodiments of the present invention are described in detail below with reference to the accompanying drawings.

FIG. 1 is a flowchart illustrating a method of controlling a taillight which is capable of brightness control and wireless communication according to an embodiment of the present invention.

Referring to FIG. 1, in the method of controlling a taillight according to this embodiment of the present invention, information about the operation of a preceding vehicle to be delivered to a following vehicle is generated at step S110.

The information about the operation of the vehicle (also called "information about the operation of the vehicle") may correspond to any one of bits "1" and "0" depending on a pulse position.

The information about the operation of the vehicle may be generated based on any one of vehicle speed information, vehicle steering information and vehicle deceleration pedal input information, and may also be generated based on any type of data to be delivered to a following vehicle, besides the above-described information.

Furthermore, a brightness control value that is used to control the brightness of a light source installed at the tail of the vehicle is generated at step S120.

The brightness control value may provide three brightness levels so that the light source also performs the functions of the sidelight and brake light of the vehicle in an integrated manner.

The three brightness levels may include a first brightness level corresponding to the case where the deceleration pedal of the vehicle is activated, a second brightness level corresponding to the case where the light source is fully turned off and a third brightness level corresponding to a predetermined brightness level between the first and second brightness levels.

The first brightness level may be higher than the second brightness level and the third brightness level, the third brightness level may be higher than the second brightness level, and the third brightness level may correspond to any one of a sidelight turn-on input and an illumination sensor input.

In this case, the brightness control value may be set to the first brightness level if the distance between a preceding vehicle and a following vehicle is lower than a threshold.

In this case, the brightness control value may be generated by a brightness control unit 230 (see FIG. 2), and may be generated based on information about the operation of a sidelight switch (hereinafter also called "sidelight switch operation information"), information about the operation of a deceleration pedal (hereinafter also called "deceleration pedal operation information"), user configuration information, the degree of input from an illumination sensor (hereinafter also called "illumination sensor input degree"), and distance input information.

At step S130, the pulse position and width of the vehicle within the unit pulse section of a pulse that controls the light source are controlled using the information about the operation of the vehicle generated at step S110 and the brightness control value generated at step S120.

The pulse position may be controlled based on the information about the operation of the vehicle, and the pulse width may be controlled based on the brightness control value.

Figure 2:
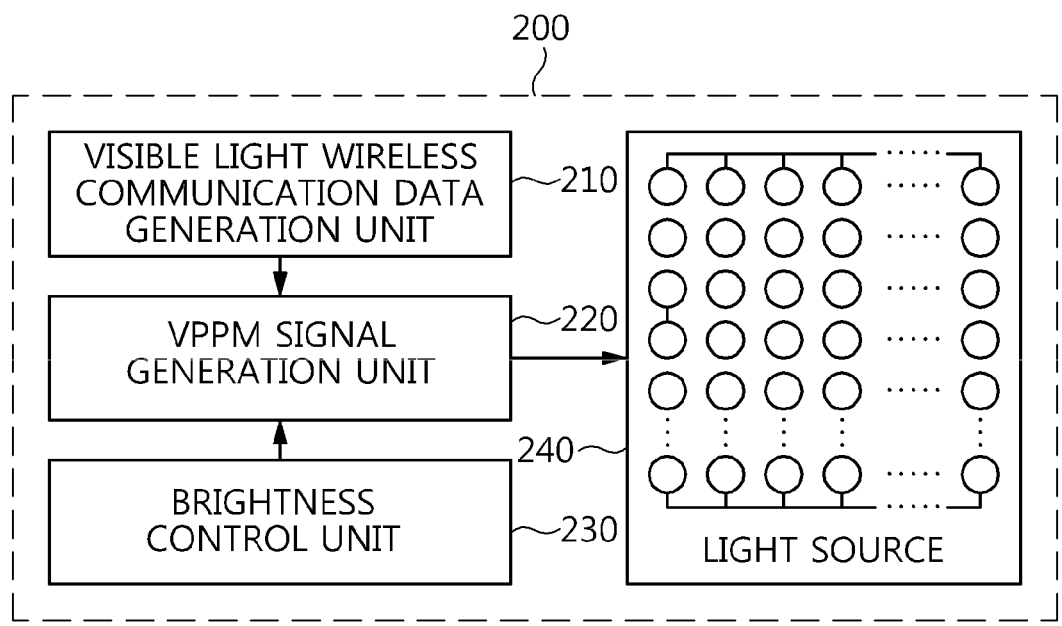
FIG. 2 is a diagram showing an apparatus for controlling the taillight of a vehicle which is capable of brightness control and wireless communication according to an embodiment of the present invention.

FIG. 2 is a diagram showing an apparatus for controlling the taillight of a vehicle which is capable of brightness control and wireless communication according to an embodiment of the present invention.

Referring to FIG. 2, the apparatus 200 for controlling the taillight of a vehicle according to this embodiment of the present invention includes a visible light wireless communication data generation unit 210, a VPPM signal generation unit 220, a brightness control unit 230, and a light source 240.

The visible light wireless communication data generation unit 210 generates information about the operation of a preceding vehicle that will be delivered to a following vehicle.

The information about the operation of the vehicle may correspond to any one of bits "1" or "0" depending on a pulse position.

The information about the operation of the vehicle may be generated based on any one of vehicle speed information, vehicle steering information, and vehicle deceleration pedal input information, and may be generated based on any type of data to be delivered to a following vehicle, besides the above-described information.

The brightness control unit 230 generates a brightness control value that is used to control the brightness of a light source 240 installed at the tail of the vehicle.

The brightness control value may provide three brightness levels so that the light source performs the functions of the sidelight and brake light of the vehicle in an integrated manner.

The three brightness levels may include a first brightness level corresponding to the case where the deceleration pedal of the vehicle is activated, a second brightness level corresponding to the case where the light source is fully turned off and a third brightness level corresponding to a predetermined brightness level between the first and second brightness levels.

The first brightness level may be higher than the second brightness level and the third brightness level, the third brightness level may be higher than the second brightness level, and the third brightness level may correspond to any one of a sidelight turn-on input and an illumination sensor input.

In this case, the brightness control value may be set to the first brightness level if the distance between a preceding vehicle and a following vehicle is lower than a threshold.

In this case, the brightness control value may be generated based on any one of sidelight switch operation information, deceleration pedal operation information, user configuration information, illumination sensor input information, and distance input information. The brightness control value may include any type of information required to generate the brightness control value, besides the above-described information.

The VPPM signal generation unit 220 generates a data signal that controls a pulse position and a pulse width within the unit pulse section of a pulse that controls the light source 240 based on the information about the operation of the vehicle generated by the visible light wireless communication data generation unit 210 and the brightness control value generated by the brightness control unit 230.

The position of the pulse is controlled based on the information about the operation of the vehicle generated by the visible light wireless communication data generation unit 210, and the width of the pulse is controlled based on the brightness control value generated by the brightness control unit 230.

The light source 240 converts the data signal, generated by the VPPM signal generation unit 220, into an optical signal, and provides the optical signal to a following vehicle.

The optical signal output by the light source 240 may provide brightness required to perform sidelight and brake light functions, and also provide information about the operation of the vehicle to a following vehicle.

Figure 3:
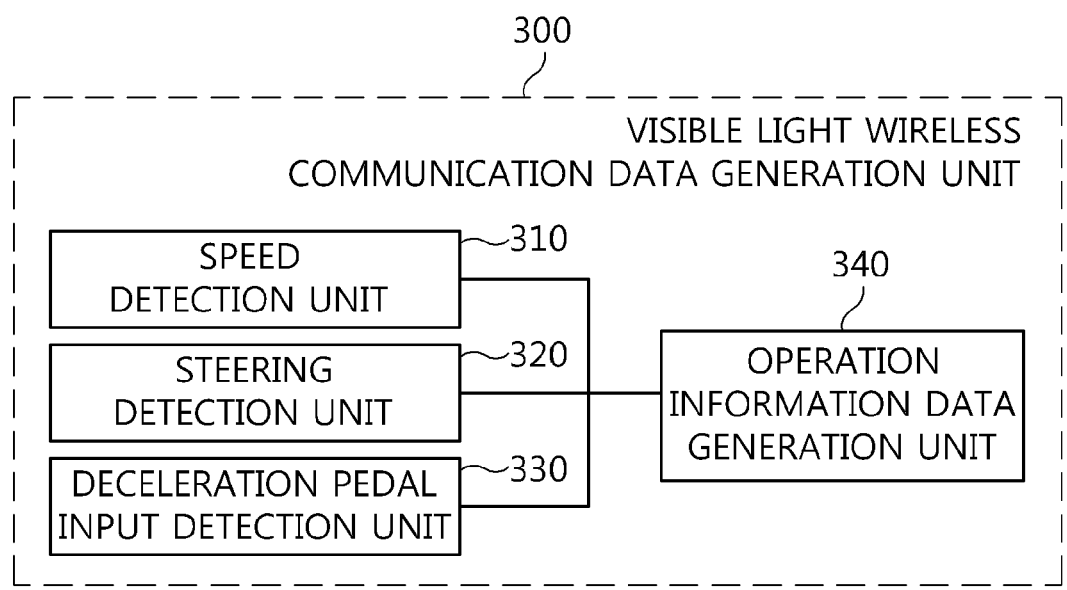
FIG. 3 is a block diagram showing an example of a visible light wireless communication data generation unit shown in FIG. 2.

FIG. 3 is a block diagram showing an example of the visible light wireless communication data generation unit shown in FIG. 2.

Referring to FIG. 3, the visible light wireless communication data generation unit 300 includes a speed detection unit 310, a steering detection unit 320, a deceleration pedal input detection unit 330, and an operation information data generation unit 340.

The visible light wireless communication data generation unit 300 may generate information about the operation of the vehicle, and may deliver the information about the operation of the vehicle to a following vehicle such that a driver who drives the following vehicle may perform safe driving.

In this case, the speed detection unit 310 may detect vehicle speed information, and may deliver the vehicle speed information to the following vehicle. When the vehicle speed information is delivered, the driver who drives the following vehicle may rapidly deal with a sudden change in the speed of the preceding vehicle.

Furthermore, the steering detection unit 320 may detect vehicle steering information, and may deliver the vehicle steering information to the following vehicle.

Furthermore, the deceleration pedal input detection unit 330 may detect whether or not vehicle deceleration pedal information has been received, and may deliver the vehicle deceleration pedal input information to the following vehicle. When the vehicle deceleration pedal input information is delivered, the driver who drives the following vehicle may rapidly deal with a sudden stop of the preceding vehicle.

Information input to the visible light wireless communication data generation unit 300 may include any type of data to be delivered to the following vehicle, besides the above-described input information.

The operation information generation unit 340 generates information about the operation of the vehicle to be delivered to the following vehicle based on information received from the speed detection unit 310, the steering detection unit 320 and the deceleration pedal input detection unit 330. The generated information about the operation of the vehicle may be converted into a VPPM optical signal, and may be delivered to the following vehicle.

Figure 4:
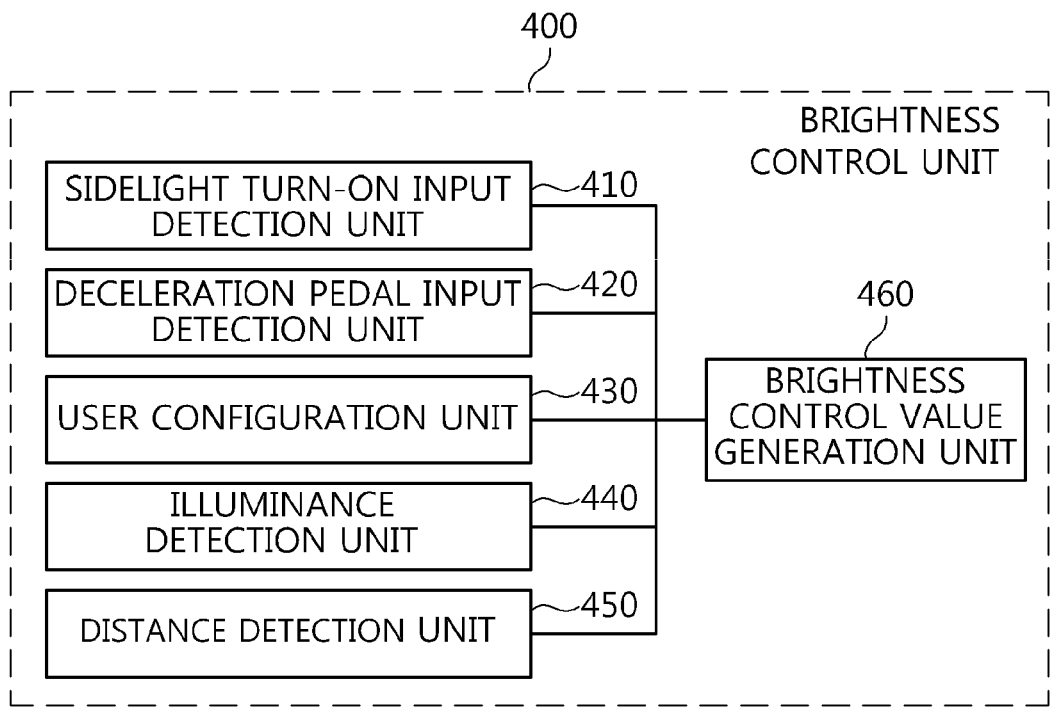
FIG. 4 is a block diagram showing an example of a brightness control unit shown in FIG. 2.

FIG. 4 is a block diagram showing an example of the brightness control unit shown in FIG. 2.

Referring to FIG. 4, the brightness control unit 400 includes a sidelight turn-on input detection unit 410, a deceleration pedal input detection unit 420, a user configuration unit 430, an Illuminance detection unit 440, a distance detection unit 450, and a brightness control value generation unit 460.

The brightness control unit 400 may generate a brightness control value that is used to control the brightness of a taillight so that the brightness of the taillight is changed in response to a user's manipulation and information input, may integrate the functions of a sidelight and a brake light into a single taillight, and may provide the integrated function.

In this case, the sidelight turn-on input detection unit 410 may detect whether or not sidelight turn-on input has been received, and may control the brightness control value. If sidelight turn-on input has been received in response to a user's manipulation, the sidelight turn-on input detection unit 410 may generate a brightness control value that allows a brightness level corresponding to a sidelight level to be applied to a taillight.

Furthermore, the deceleration pedal input detection unit 420 may detect whether or not vehicle deceleration pedal input has been received, and may control a brightness control value. When a driver steps on a brake, the deceleration pedal input detection unit 420 may generate a brightness control value that allows a brightness level corresponding to a brake light level to be applied.

Furthermore, the user configuration unit 430 may generate a brightness control value based on information input by a driver.

Furthermore, the Illuminance detection unit 440 may control a brightness control value based on information about an external illumination state.

The Illuminance detection unit 440 may compare a detected external illumination state with a predetermined illuminance threshold. If the external illumination is lower than the predetermined illuminance threshold, the Illuminance detection unit 440 may generate a brightness control value that allows a brightness level corresponding to a sidelight level to be applied.

Furthermore, the distance detection unit 450 may control a brightness control value based on information about a detected distance between a preceding vehicle and a following vehicle. If the detected distance between a preceding vehicle and a following vehicle is smaller than the predetermined threshold, the distance detection unit 450 may generate a brightness control value that allows a brightness level corresponding to a brake light level to be applied to the taillight of the preceding vehicle, and may warn a driver in a following vehicle.

Information input to the brightness control unit 400 may include any type of data required to set a brightness control value, besides the above-described input information.

The brightness control value generation unit 460 generates a brightness control value that is used to control the brightness of the taillight based on the information received from the sidelight turn-on input detection unit 410, the deceleration pedal input detection unit 420, the user configuration unit 430, the Illuminance detection unit 440 and the distance detection unit 450. The generated brightness control value may be converted into a VPPM signal, and may control the brightness of a light source installed at the tail of a vehicle, thereby being able to perform the functions of a sidelight and a brake light.

Figure 5:
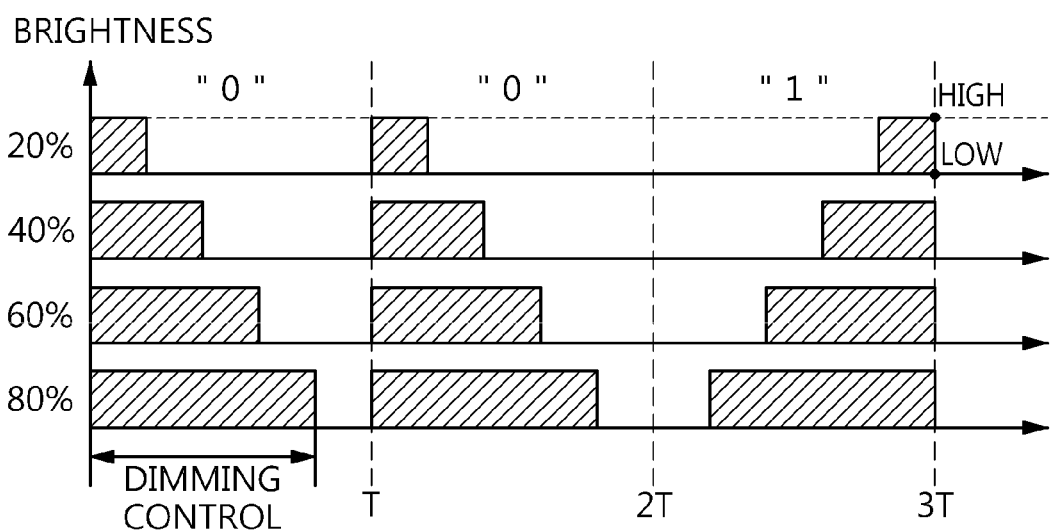
FIG. 5 is a diagram showing the data signal modulation technology of a VPPM signal generation unit shown in FIG. 2.

FIG. 5 is a diagram showing the data signal modulation technology of the VPPM signal generation unit shown in FIG. 2.

From FIG. 5, it can be seen that bit "1" or "0" is represented depending on the position of a pulse and the brightness of a light source changes in response to the width of the pulse.

In the method of controlling a taillight according to an embodiment of the present invention, the VPPM modulation technology of FIG. 5 is used to control the brightness of a taillight and to send data.

A bit may be determined depending on whether a pulse section is located in the front or rear half of a unit section. If bit "0" is represented when a pulse section is located in the front half of the unit section, bit "1" is represented if the pulse section is located in the rear half of the unit section. In contrast, if bit "1" is represented when a pulse section is located in the front half of the unit section, bit "0" is represented when a pulse section is located in the rear half of the unit section.

The brightness of light may be controlled by controlling the time during which a light source remains turned on by 20% when the width of the pulse is 20% depending on a pulse width. As shown in FIG. 5, light becomes brighter as a section "high," that is, the state in which the light source remains turned on, increases per time T. As a result, brightness is increased because the time during which the light source remains turned on becomes longer as the width of the pulse increases.

Figure 6:
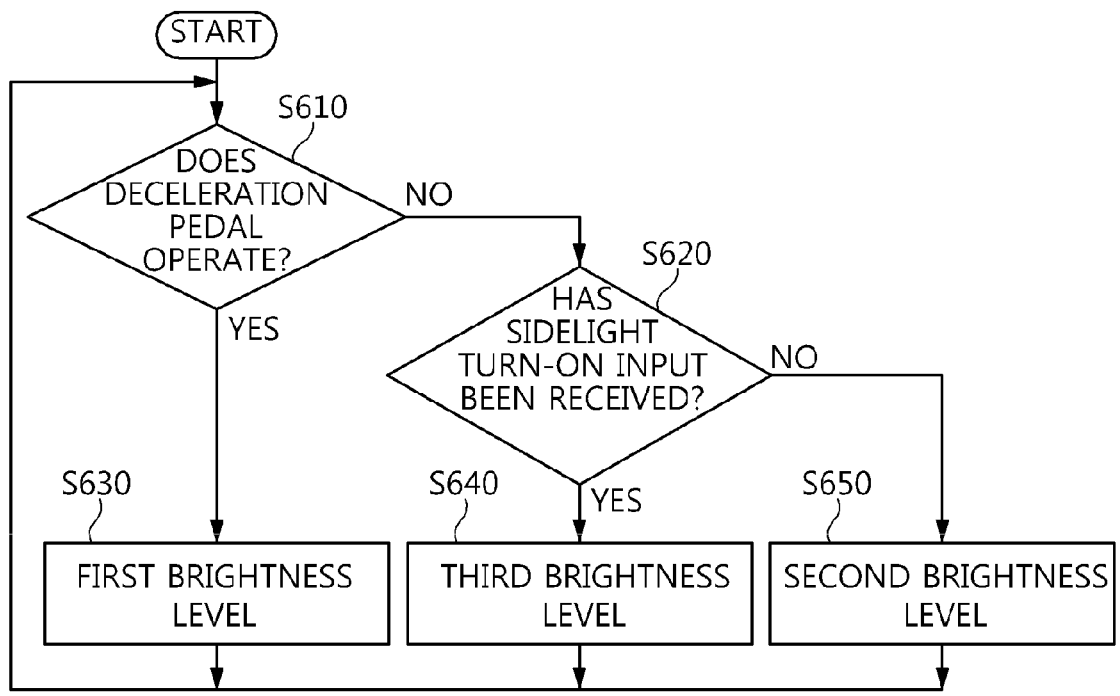
FIG. 6 is a flowchart illustrating a first example of step S120 shown in FIG. 1.

FIG. 6 is a flowchart illustrating a first example of step S120 shown in FIG. 1.

Referring to FIG. 6, in the method of controlling the brightness of the taillight of a vehicle according to the first example of step S120 shown in FIG. 1, whether or not deceleration pedal operation input has been received is determined at step S610.

If, as a result of the determination at step S610, it is determined that the deceleration pedal operation input has been received, a brightness control value corresponding to a first brightness level is applied to the taillight of the vehicle at step S630.

If, as a result of the determination at step S610, it is determined that the deceleration pedal operation input has not been received, whether or not sidelight turn-on input has been received is determined at step S620.

If, as a result of the determination at step S620, it is determined that the sidelight turn-on input has been received, a brightness control value corresponding to a third brightness level is applied to the taillight at step S640.

If, as a result of the determination at step S620, it is determined that the sidelight turn-on input has not been received, a brightness control value corresponding to a second brightness level is applied to the taillight at step S650.

In this case, the second brightness level may correspond to the case where the light source has been fully turned off. In this case, a visible light wireless communication VPPM signal is not transmitted through the taillight.

Furthermore, the first brightness level may be higher than the second brightness level and the third brightness level, the third brightness level may be higher than the second brightness level, and the third brightness level may be higher than a sidelight level.

Furthermore, a range in which a user sets the brightness of the taillight is set such that it complies with regulations regarding a vehicle sidelight and brake light.

Figure 7:
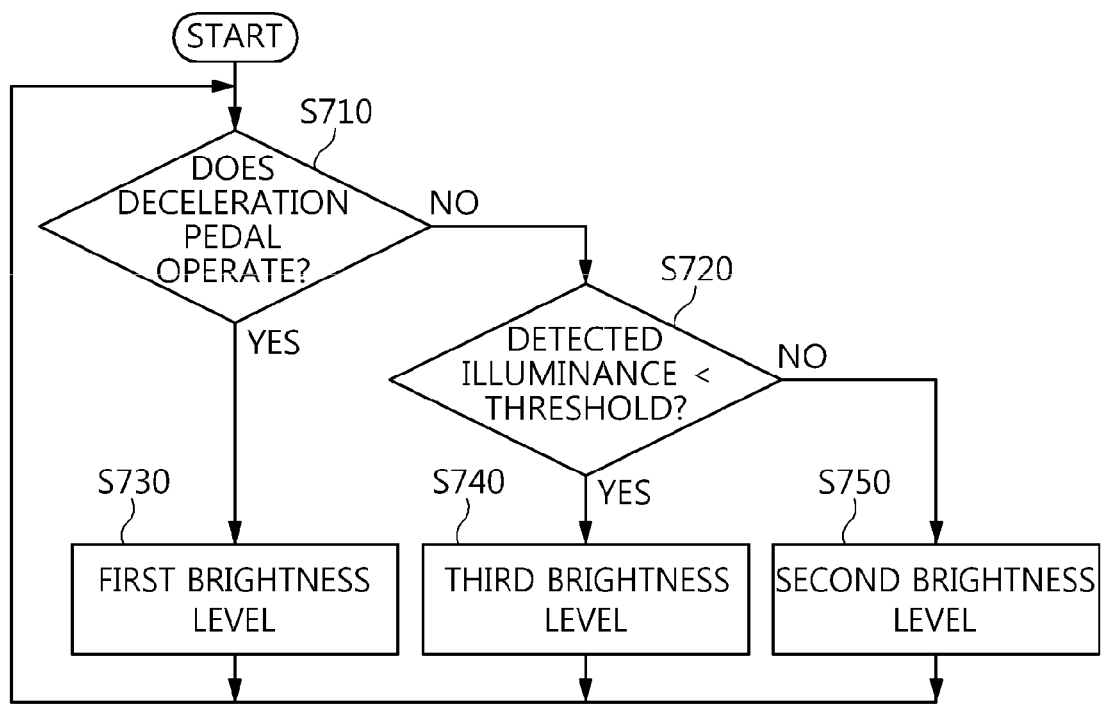
FIG. 7 is a flowchart illustrating a second example of step S120 shown in FIG. 1.

FIG. 7 is a flowchart illustrating a second example of step S120 shown in FIG. 1.

Referring to FIG. 7, in the method of controlling the brightness of the taillight of a vehicle according to the second example of step S120 shown in FIG. 1, whether or not deceleration pedal operation input has been received is determined at step S710.

If, as a result of the determination at step S710, it is determined that the deceleration pedal operation input has been received, a brightness control value corresponding to a first brightness level is applied to the taillight of the vehicle at step S730.

If, as a result of the determination at step S710, it is determined that the deceleration pedal operation input has not been received, whether or not an external illuminance detected by the illumination sensor of the vehicle is lower than a predetermined illuminance threshold is determined at step S720.

If, as a result of the determination at step S720, it is determined that the external illuminance detected by the illumination sensor of the vehicle is lower than the predetermined illuminance threshold, a brightness control value corresponding to a third brightness level is applied to the taillight at step S740.

If, as a result of the determination at step S720, it is determined that the external illuminance detected by the illumination sensor of the vehicle is not lower than the predetermined illuminance threshold, a brightness control value corresponding to a second brightness level is applied to the taillight at step S750.

In this case, the second brightness level may correspond to the case where a light source may have been fully turned off. In this case, a visible light wireless communication VPPM signal is not transmitted through the taillight.

Furthermore, the first brightness level may be higher than the second brightness level and the third brightness level, the third brightness level may be higher than the second brightness level, and the third brightness level may be a sidelight level.

Furthermore, a range in which a user sets the brightness of the taillight is set such that it complies with regulations regarding a vehicle sidelight and brake light.

Figure 8:
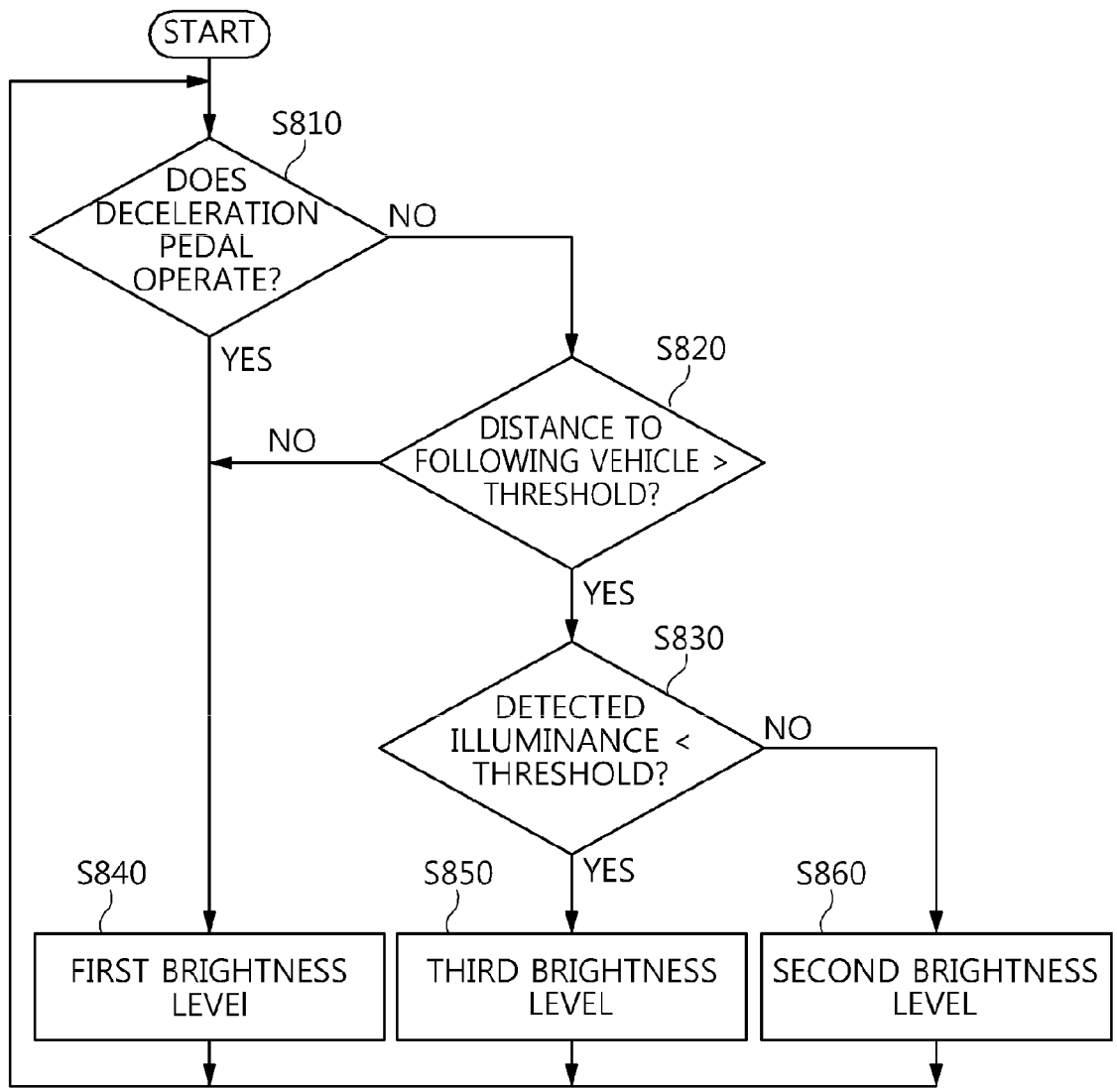
FIG. 8 is a flowchart illustrating a third example of step S120 shown in FIG. 1.

FIG. 8 is a flowchart illustrating a third example of step S120 shown in FIG. 1.

Referring to FIG. 8, in the method of controlling the brightness of the taillight of a preceding vehicle according to the third example of step S120 shown in FIG. 1, whether or not deceleration pedal operation input has been received is determined at step S810.

If, as a result of the determination at step S810, it is determined that the deceleration pedal operation input has been received, a brightness control value corresponding to a first brightness level is applied to the taillight of the preceding vehicle at step S840.

If, as a result of the determination at step S810, it is determined that the deceleration pedal operation input has not been received, whether or not the distance to a following vehicle detected by the distance sensor of the preceding vehicle is greater than a predetermined threshold is determined at step S820.

If, as a result of the determination at step S820, it is determined that the distance between the preceding and following vehicles is shorter than the predetermined threshold, a brightness control value corresponding to a first brightness level is applied to the taillight at step S840.

If, as a result of the determination at step S820, it is determined that the distance between the preceding and following vehicles is not shorter than the predetermined threshold, whether or not external illuminance detected by the illumination sensor of the preceding vehicle is lower than a predetermined illuminance threshold is determined at step S830.

If, as a result of the determination at step S830, it is determined that the detected external illumination is lower than the predetermined illuminance threshold, a brightness control value corresponding to a third brightness level is applied to the taillight at step S850.

If, as a result of the determination at step S830, it is determined that the detected external illumination is not less than the predetermined illuminance threshold, a brightness control value corresponding to a second brightness level is applied to the taillight at step S860.

In this case, the second brightness level may correspond to the case where the light source has been fully turned off. In this case, a visible light wireless communication VPPM signal is not transmitted through the taillight.

Furthermore, the first brightness level may be higher than the second brightness level and the third brightness level, the third brightness level may be higher than the second brightness level, and the third brightness level may be higher than a sidelight level.

Furthermore, a range in which a user sets the brightness of the taillight is set such that it complies with regulations regarding a vehicle sidelight and brake light.

Figure 9:
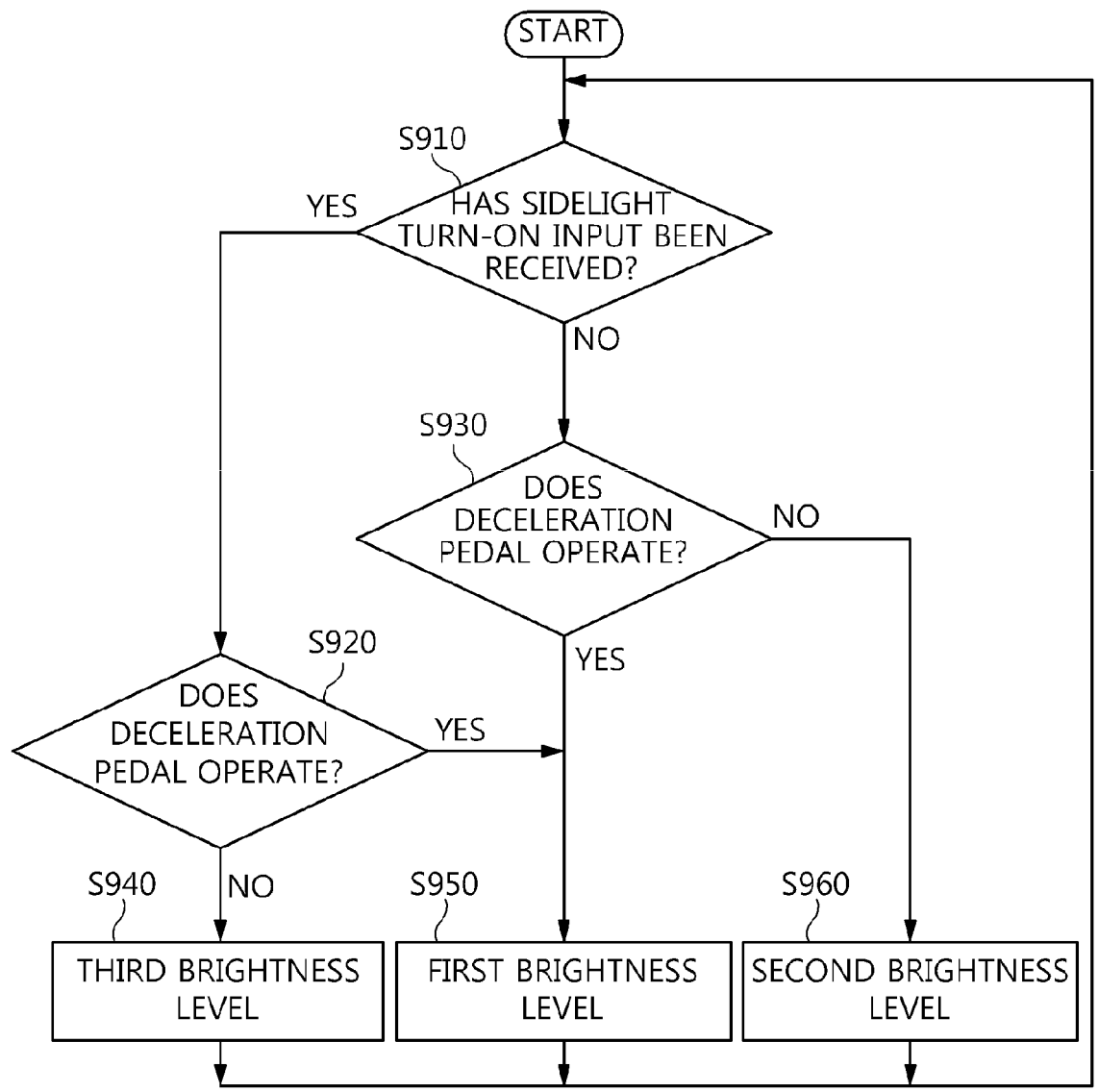
FIG. 9 is a flowchart illustrating a fourth example of step S120 shown in FIG. 1.

FIG. 9 is a flowchart illustrating a fourth example of step S120 shown in FIG. 1.

Referring to FIG. 9, in the method of controlling the brightness of the taillight of a vehicle according to the fourth example of step S120 shown in FIG. 1, whether or not sidelight turn-on input has been received is determined at step S910.

If, as a result of the determination at step S910, it is determined that the sidelight turn-on input has been received, whether or not deceleration pedal operation input has been received is determined at step S920.

If, as a result of the determination at step S920, it is determined that the deceleration pedal operation input has been received, a brightness control value corresponding to a first brightness level is applied to the taillight of the vehicle at step S950.

If, as a result of the determination at step S920, it is determined that the deceleration pedal operation input has not been received, a brightness control value corresponding to a third brightness level is applied to the taillight at step S940.

If, as a result of the determination at step S910, it is determined that the sidelight turn-on input has not been received, whether or not deceleration pedal operation input has been received is determined at step S930.

If, as a result of the determination at step S930, it is determined that the deceleration pedal operation input has been received, a brightness control value corresponding to a first brightness level is applied to the taillight at step S950.

If, as a result of the determination at step S930, it is determined that the deceleration pedal operation input has not been received, a brightness control value corresponding to a second brightness level is applied to the taillight at step S960.

In this case, the second brightness level may correspond to the case where the light source has been fully turned off. In this case, a visible light wireless communication VPPM signal is not transmitted through the taillight.

Furthermore, the first brightness level may be higher than the second brightness level and the third brightness level, the third brightness level may be higher than the second brightness level, and the third brightness level may be higher than a sidelight level.

Furthermore, a range in which a user sets the brightness of the taillight is set such that it complies with regulations regarding a vehicle sidelight and brake light.

As described above, at least one embodiment of the present invention provides a method of controlling the taillight of a vehicle, which is capable of controlling its brightness in response to information about the manipulation of a driver and external input information and also transmitting information about the operation of a vehicle to a following vehicle.

Furthermore, at least one embodiment of the present invention provides the advantage of integrating the function of a sidelight indicative of the presence and width of a vehicle during nighttime driving and the function of a brake light operative to be automatically turned on when a driver steps on the brake of a vehicle into a single function and then providing the integrated function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a taillight of a vehicle, comprising:
generating information about an operation of a vehicle;
generating a brightness control value that is used to control brightness of a light source installed at a tail of the vehicle; and
controlling a pulse position and a pulse width within a unit pulse section of a pulse that controls the light source based on the information about the operation of the vehicle and the brightness control value,
wherein controlling the pulse position and the pulse width comprises controlling the pulse position based on the information about the operation of the vehicle and controlling the pulse width based on the brightness control value.

2. The method of claim 1, wherein the brightness control value provides three brightness levels so that the light source performs functions of a sidelight and brake light of the vehicle in an integrated manner.

3. The method of claim 2, wherein the three brightness levels comprise a first brightness level corresponding to a case where a deceleration pedal of the vehicle is fully activated, a second brightness level corresponding to a case where the light source is fully turned off, and a third brightness level corresponding to a predetermined brightness level between the first and second brightness levels.

4. The method of claim 3, wherein the first brightness level is higher than the second brightness level and the third brightness level, the third brightness level is higher than the second brightness level, and the third brightness level corresponds to any one of sidelight turn-on input and illumination sensor input.

5. The method of claim 4, wherein the brightness control value is set to the first brightness level if a distance between the vehicle and a following vehicle is shorter than a threshold.

6. The method of claim 5, wherein the brightness control value is generated based on any one of sidelight switch operation information, deceleration pedal operation information, user configuration information, illumination sensor input information, and distance input information.

7. The method of claim 1, wherein the information about the operation of the vehicle corresponds to any one of bits "1" and "0" depending on the pulse position.

8. The method of claim 7, wherein the information about the operation of the vehicle is generated based on any one of vehicle speed information, vehicle steering information, and vehicle deceleration pedal input information.

9. An apparatus for controlling a taillight of a vehicle, comprising:
a visible light wireless communication data generation unit configured to generate information about an operation of a vehicle;
a brightness control unit configured to generate a brightness control value that is used to control brightness of a light source installed at a tail of the vehicle;
a variable pulse position modulation (VPPM) signal generation unit configured to control a pulse position and a pulse width within a unit pulse section of a pulse that controls the light source based on the information about the operation of the vehicle and the brightness control value,
to convert a data signal into an optical signal, and to provide the optical signal to a following vehicle,
wherein the data signal controls the pulse position based on the information about the operation of the vehicle, and controls the pulse width based on the brightness control value.

10. The apparatus of claim 9, wherein the brightness control value provides three brightness levels so that the light source performs functions of a sidelight and brake light of the vehicle in an integrated manner.

11. The apparatus of claim 10, wherein the three brightness levels comprise a first brightness level corresponding to a case where a deceleration pedal of the vehicle is fully activated, a second brightness level corresponding to a case where the light source is fully turned off, and a third brightness level corresponding to a predetermined brightness level between the first and second brightness levels.

12. The apparatus of claim 11, wherein the first brightness level is higher than the second brightness level and the third brightness level, the third brightness level is higher than the second brightness level, and the third brightness level corresponds to any one of sidelight turn-on input and illumination sensor input.

13. The apparatus of claim 12, wherein the brightness control value is set to the first brightness level if a distance between the vehicle and a following vehicle is shorter than a threshold.

14. The apparatus of claim 13, wherein the brightness control value is generated based on any one of sidelight switch operation information, deceleration pedal operation information, user configuration information, illumination sensor input information, and distance input information.

15. The apparatus of claim 9, wherein the information about the operation of the vehicle corresponds to any one of bits "1" and "0" depending on the pulse position.

16. The apparatus of claim 15, wherein the information about the operation of the vehicle is generated based on any one of vehicle speed information, vehicle steering information, and vehicle deceleration pedal input information.

* * * * *